No. 766,637. PATENTED AUG. 2, 1904.
A. H. MARKS & W. M. METZLER.
WHEEL TIRE.
APPLICATION FILED AUG. 27, 1903.
NO MODEL.

Witnesses.
E. B. Gilchrist
J. B. Hull

Inventors,
Arthur H. Marks,
William M. Metzler,
By their Attorneys,
Thurston & Bates No. 766,637. Patented August 2, 1904.

UNITED STATES PATENT OFFICE.

ARTHUR H. MARKS AND WILLIAM M. METZLER, OF AKRON, OHIO, ASSIGNORS TO THE DIAMOND RUBBER COMPANY, OF AKRON, OHIO, A CORPORATION OF WEST VIRGINIA.

WHEEL-TIRE.

SPECIFICATION forming part of Letters Patent No. 766,637, dated August 2, 1904.

Application filed August 27, 1903. Serial No. 170,922. (No model.)

*To all whom it may concern:*

Be it known that we, ARTHUR H. MARKS and WILLIAM M. METZLER, citizens of the United States, residing at Akron, in the county of Summit and State of Ohio, have invented a certain new and useful Improvement in Wheel-Tires, of which the following is a full, clear, and exact description, reference being had to the accompanying drawings.

This invention is a rubber tire especially constructed with the object of producing a very durable tire capable of bearing heavy loads; and the invention consists of a solid vulcanized-rubber tire in which there is embedded closely-placed transverse pieces of woven wire fabric, substantially as hereinafter described and claimed.

Figure 1:
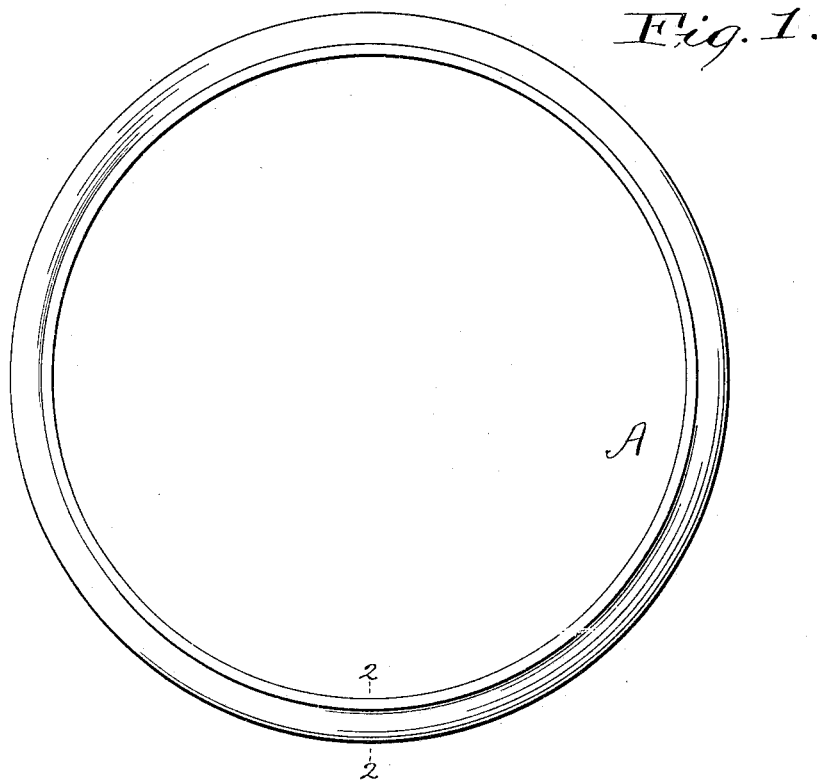
Figure 2:
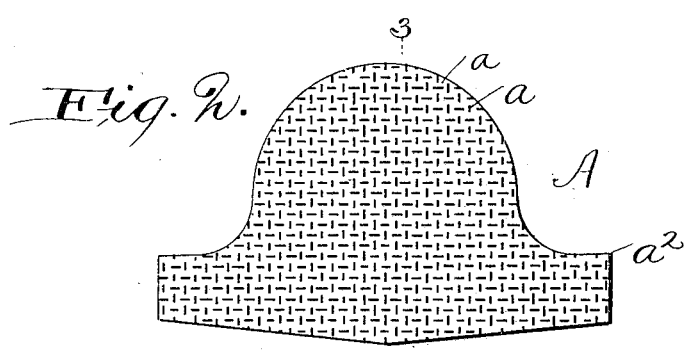
Figure 3:
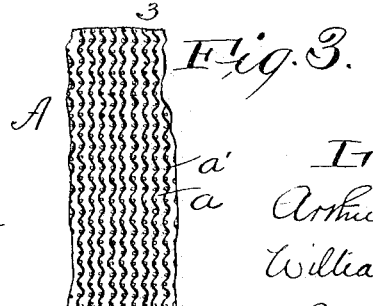

In the drawings, Figure 1 is a side elevation of a tire embodying the invention. Fig. 2 is a transverse sectional view thereof, and Fig. 3 is a longitudinal section of a piece of the tire.

The tire A is made of alternate transverse layers of rubber $a$ and similarly-shaped pieces of woven wire fabric $a'$, pieces of the latter being placed at about an eighth of an inch, more or less, apart. The rubber layers, which are unvulcanized when the tire is assembled in the mold, find their way through the interstices of the intervening wire fabric into intimate contact with each other. Therefore the finished tire after vulcanization is a substantially homogeneous structure of vulcanized rubber having embedded in it at close intervals transverse strips of woven wire fabric which correspond in shape and size with the cross-section of said tire.

This tire is especially adapted for use on heavy vehicle-wheels, and it has projecting from opposite edges of its base the two ribs $a^2$, with which fastening devices may be engaged to hold it upon the wheel-rim.

This tire resists wear because the wearing-surfaces are composed partly of rubber and partly of metal, and the rubber will wear no faster than the metal. The wire-fabric pieces extend into the wings $a^2$ and strengthen them to an extent which practically prevents them from being torn by the fastening devices in use.

Having described our invention, we claim—

A solid-rubber vehicle-tire having an outwardly-projecting tread and on opposite sides thereof at the base laterally-projecting ribs by which the tire is adapted to be held in place and having embedded in it at close intervals transverse pieces of woven wire fabric which extend completely across the tire and correspond with it in size and shape and thus not only prevent the wear of the tread but strengthen the ribs and assist in holding the tire in place, the rubber and wire being firmly vulcanized together, substantially as and for the purpose specified.

In testimony whereof we hereunto affix our signatures in the presence of two witnesses.

ARTHUR H. MARKS.
WILLIAM M. METZLER

Witnesses:
 J. L. MARSHALL,
 O. S. HART.